(12) United States Patent
Theus et al.

(10) Patent No.: US 6,626,453 B1
(45) Date of Patent: Sep. 30, 2003

(54) ROLLING CART FOR TRANSPORTING BEACH ITEMS

(76) Inventors: Robert Theus, 2001 Lindsey Bridge Rd., Andalusia, AL (US) 36420; Elizabeth Ann Theus, 2001 Lindsey Bridge Rd., Andalusia, AL (US) 36420

( * ) Notice: Subject to any disclaimer, the term of this patent is extended or adjusted under 35 U.S.C. 154(b) by 30 days.

(21) Appl. No.: 09/875,110

(22) Filed: Jun. 7, 2001

(51) Int. Cl.$^7$ ................................................ B62B 1/10
(52) U.S. Cl. ................................. 280/652; 280/47.26
(58) Field of Search .................... 280/639, 37, 341, 280/645, 651, 652, 47.18, 47.23, 47.24, 47.26, 79.11, 79.2, 206, 207, 208; 301/5.23

(56) References Cited

U.S. PATENT DOCUMENTS

| | | | | |
|---|---|---|---|---|
| 3,044,794 A | * | 7/1962 | Franklin et al. | ............ 280/652 |
| 3,062,560 A | * | 11/1962 | Dunstan | ..................... 280/208 |
| 3,856,166 A | * | 12/1974 | Gibson | .................... 280/47.26 |
| 4,160,495 A | * | 7/1979 | Conard | .................... 280/47.26 |
| 4,822,065 A | * | 4/1989 | Enders | ........................ 280/652 |
| 5,062,653 A | * | 11/1991 | Deglis et al. | .................. 280/37 |
| 5,159,777 A | * | 11/1992 | Gonzalez | ................. 280/47.26 |
| 5,277,449 A | * | 1/1994 | Schmidt | ................... 280/47.26 |
| 6,382,640 B1 | * | 5/2002 | Killian | ........................ 280/809 |

FOREIGN PATENT DOCUMENTS

| | | | | |
|---|---|---|---|---|
| AT | 112763 | * | 11/1928 | ................. 280/206 |
| FR | 615225 | * | 12/1926 | ............ 280/87.042 |

* cited by examiner

*Primary Examiner*—Frank Vanaman
(74) *Attorney, Agent, or Firm*—William B. Noll

(57) ABSTRACT

A rolling cart suitable for receiving and transporting a variety of items over loose ground, such as the sand of a beach. The rolling cart includes a pair of large ring wheels that exhibit a large footprint for easy movement over and through sand, and is characterized by a high center of gravity to facilitate handling. Disposed between the wheels is a basket assembly that mounts plural rollers which cooperate with the inner wall of the wheels to maintain a generally fixed orientation during movement of the wheels.

10 Claims, 5 Drawing Sheets

ROLLING CART FOR TRANSPORTING BEACH ITEMS

FIELD OF THE INVENTION

This invention is directed to leisure beach items, more particularly to a rolling cart, having large wheels to ensure a large footprint, for transporting, over sand, a variety of items, such as a cooler, umbrella, towels, etc.

BACKGROUND OF THE INVENTION

The present invention relates to a rolling cart, having large wheels with a broad footprint, with a floating tray for receiving and transporting various beach items to the beach. The large footprint allows for easy and convenient movement of such items to the desired location on the beach.

A day at the beach, especially when one has to escort and guide young children, can be a daunting task, having to carry a variety of items, ranging from a cooler, blankets, towels, umbrellas, toys, etc., while keeping a watchful eye on the children, can even make parents think twice before agreeing to a day at the beach. Any accessory that makes this task easier is a welcome item to a family seeking to enjoy a day of sand, sun and water. However, even items that have to be carried can be a burden to the user. Unfortunately, most such beach accessories have to be carried. The following prior art describe and illustrate a number of beach accessories to help the user, but none offer the full convenience of being able to be readily transported, even weighty items, such as coolers, along with other traditional beach items. The following U.S. Patents are exemplary of the offerings by the prior art:

a.) U.S. Pat. No. 6,131,925, to Weldon, relates to a cart intended to provide an easy means to transport items held on the cart platform to a sandy beach location. The device is provided with a contoured back and foldable seat so that it can serve as a beach chair once at the beach. In addition, retaining rings provide for the secure carrying of a beach umbrella. The carrying platform is supported at both ends when not being moved and is further supported by straps during transit. A pressurized sprayer mounted on the side of the cart back allows fresh water to be easily transported to the beach, warmed, and used to remove salt water and sand both from people and accessories.

b.) U.S. Pat. No. 6,079,777, to Simmons et al., teaches a chaise lounge and tote cart apparatus formed of a fabric covered base frame having first and second fabric covered extension frames hinged to each end of the base frame. Four foldable wheel assemblies are attached to the base frame so that the wheel assemblies can be moved from an extended position to a forward position and each of the extension frames can be folded over onto the base frame to make a compact chaise lounge and tote cart combination. The wheel assembly can be unfolded to extend the wheels and the first and second extension frames can be opened up to a generally parallel vertical position. A locking bar can be removably connected therebetween to hold the first and second extension frames upright and parallel so that items can be carried on the wheel base and can be laid across the tops of the upright first and second extension frames. A hinged handle is also provided for pulling the cart and one or two fabric sides can be connected between first and second extension frames.

c.) U.S. Pat. No. 5, 356,160, to Urlwin, illustrates a collapsible, wheeled, chair frame and tray assembly that includes an axle, supported in a pair of brackets, and having wheels mounted to ends thereof, also pivotably carries a utility tray thereon. The brackets are provided for bolting thereof to leg members of a chair frame, to wheel the frame. The chair frame is collapsible, and the tray can be folded-up, unobtrusively with the component parts of the chair frame, or disposed prominently therefrom for wheeled transport of supplies and/or articles. With the chair frame expanded, into its seating disposition, the tray assumes a position substantially parallel with the seat frame, and therebelow, and the wheels are elevated in non-load-bearing disposition.

d.) U.S. Pat. No. 5,056,804, to Wilson et al., relates to a device that folds flat and compact for storage, and opens to a folding lounge chair with an adjustable angle back-rest. The device includes a backrest frame and a seat frame across which is stretched a fabric web to support an occupant. The two frames are joined at one end by an adjustable angle hinge. At a second end of the back-rest frame is a handle. At a second end of the seat frame is a pair of wheels on an axle suspended below the seat. Folding U-shape support members can be extended transverse to the frame to hold the chair above a supporting surface. The frames can be opened to lie in a common plane and the chair turned over to form a rolling cart with one or more support members extended to hold items for transporting with the wheels down, the handle up and what had been the under surface of the fabric web now serving as the upper surface to support items.

e.) U.S. Pat. No. 4,863,075, to Romer, is directed to a beach caddy used for transporting and storing items for recreational use at the beach. The caddy is provided with runners for drawing across sandy surfaces and detachable wheels for rolling over paved surfaces. A refillable water tank within the caddy dispenses fluids for washing, drinking, or any other use. An adjustable support is provided for retaining a beach umbrella and permitting it to be tilted in any desired direction. Detachable tables mounted on the sides of the caddy can be set up to support items transported by the caddy.

f.) U.S. Pat. No. 4,703,944, to Higson, teaches a beach caddy comprising a vertical frame assembly, a hinged chair rack, a hinged platform and a hinged table leg frame. The vertical frame assembly consists of an upper and a lower section connected at two vertical members, rectangular in cross section, by hinges. Each of the vertical members increases in depth at its lower end to form a storage space in conjunction with a rear and front panel and an upper and lower cross-member, the upper cross-member having circular orifices of sufficient diameter to allow protrusion therethrough of the shafts of standard beach umbrellas and standard fishing poles. To the face of the vertical members of the frame are permanently affixed table panels each located approximately adjacent to and flush with the next for use, when the vertical frame assembly is deployed in a horizontal position, as a table. An axle with a wheel on each end is attached to the front of the rear panel by two axle brackets. The chair rack is attached by hinges to the front of the lower vertical frame assembly. The platform assembly, which comprises one or more platform panels, is attached by hinges to the front of the lower vertical frame assembly. The table leg frame is attached by hinges to the rear of the lower vertical frame assembly.

While each of the foregoing patents teach some way to enhance one's enjoyment at the beach, they all suffer a significant shortcoming in their ability to be easily moved over the surface of the sand. Specifically, each prior art device of the above patents uses small wheels, relative to the item being transported, which makes moving through loose sand a very difficult procedure, particularly when there is any weight in the device. The present invention, by the use of large wheels having a broad footprint, avoids such problems, but also adds some new features that make the system hereof unique among beach accessories. The manner by which this invention achieves the desired goals will become apparent in the description which follows, especially when read in conjunction with the accompanying drawings.

SUMMARY OF THE INVENTION

This invention relates to a rolling cart for transporting items over a yielding surface, such as sand at the beach, where the rolling cart comprises a pair of large, circular and continuous ring wheels, which when rolled through the sand leave a large footprint that helps to avoid being stuck in the sand. The ring wheels feature an outer surface for contacting the sand, and an inner, continuous surface having an inwardly directed rib. Mounted between said ring wheels is a basket assembly for containing certain items to be transported. The basket comprises first and second rigid wall sections that are hinged along respective adjacent edges, such as by a piano hinge, as known in the art, where the respective sections may be collapsed together to facilitate storage of the rolling cart. The hinge further includes an axle that mounts a pair of rollers at its ends for engaging and rolling along the rib on the inner ring wheel surface. Additionally, the free ends of the two rigid wall sections also include axles, each mounting a roller that rides along a respective said rib. By this arrangement, the basket assembly remains in a generally fixed orientation even though the ring wheels are rotating as one moves the rolling cart of the invention. For convenience, a hanger element may be provided to suspend the roller cart in a collapsed mode for easy storage.

Accordingly, an object of this invention is to provide a readily transportable rolling cart, having a large footprint, that can be easily maneuvered over loose ground, such as sand.

Another object hereof is the provision of a rolling cart that is easily assembled, then collapsed into a compact unit for easy suspension and storage.

A further object of the invention lies in the use of a pair of large, spaced apart ring wheels for easy transportation, while providing a broad open area therebetween for receiving a basket assembly of items to be taken to the beach These and other objects of the invention will become more apparent in the further description, especially by those skilled in the art.

DETAILED DESCRIPTION OF PREFERRED EMBODIMENT

Figure 1:
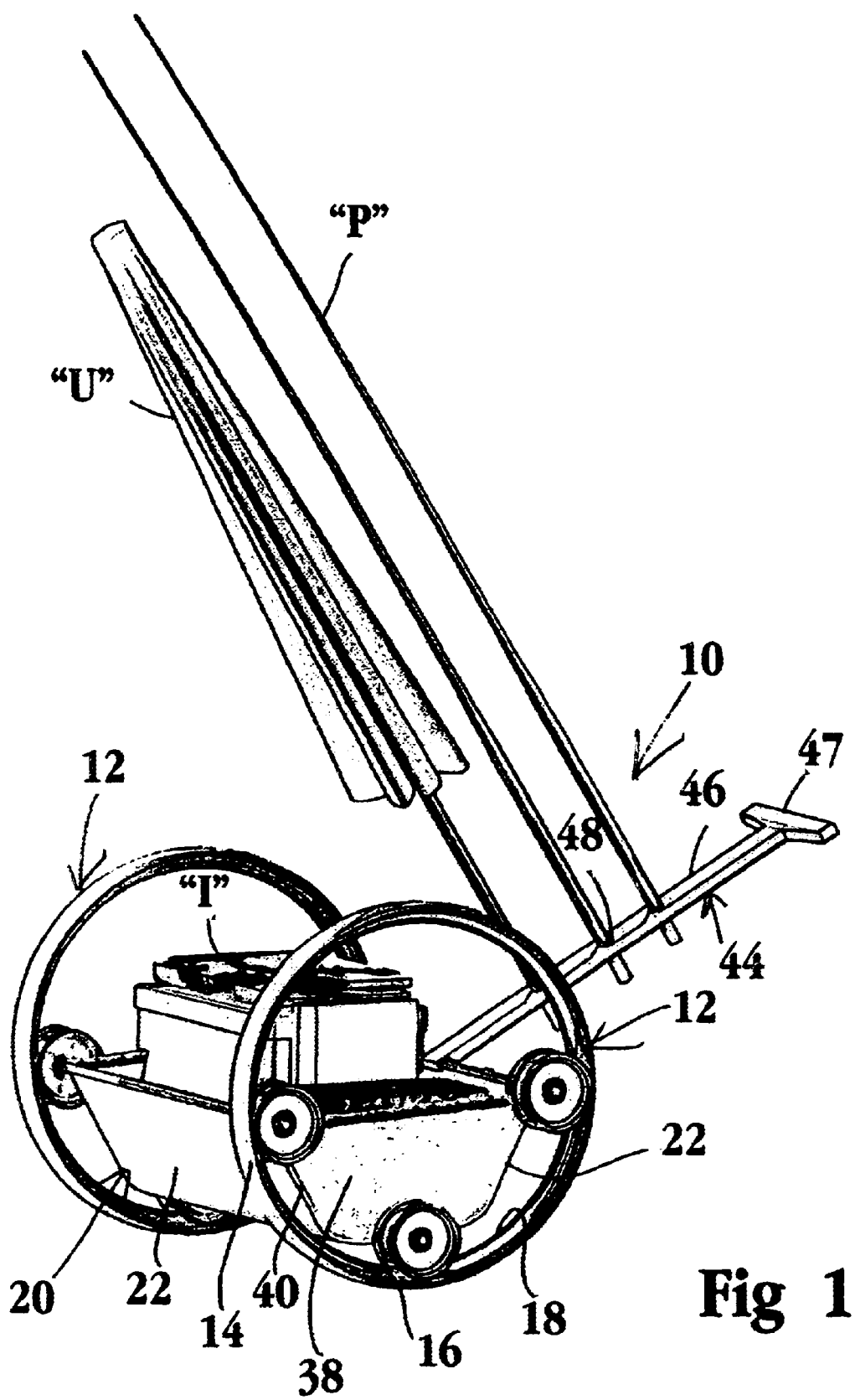
FIG. 1 is a perspective view of the rolling cart for transporting a variety of items along a yieldable surface, such as sand, showing the cart in a transporting mode with such items inaccordance with this invention.

The present invention is directed to a rolling cart, presenting a large footprint, that has particular utility in transporting various items, such as a cooler, fishing poles, umbrella, towels, etc. to the beach. The rolling cart features a pair of large wheel rings and a floating basket assembly therebetween. The invention will now be described with regard to the various Figures, where like reference numerals represent like components or features throughout the different views.

Turning first to FIG. 1, where the rolling cart 10 of this invention is shown in a loaded or transporting mode, ready for the beach. The rolling cart 10 comprises a pair of large, spaced apart, wheel rings 12, where such wheel rings feature an outer peripheral, sand contacting surface 14, and an inner surface 16 that includes a continuous rib 18, the purpose of which will be apparent hereafter.

Figure 2:
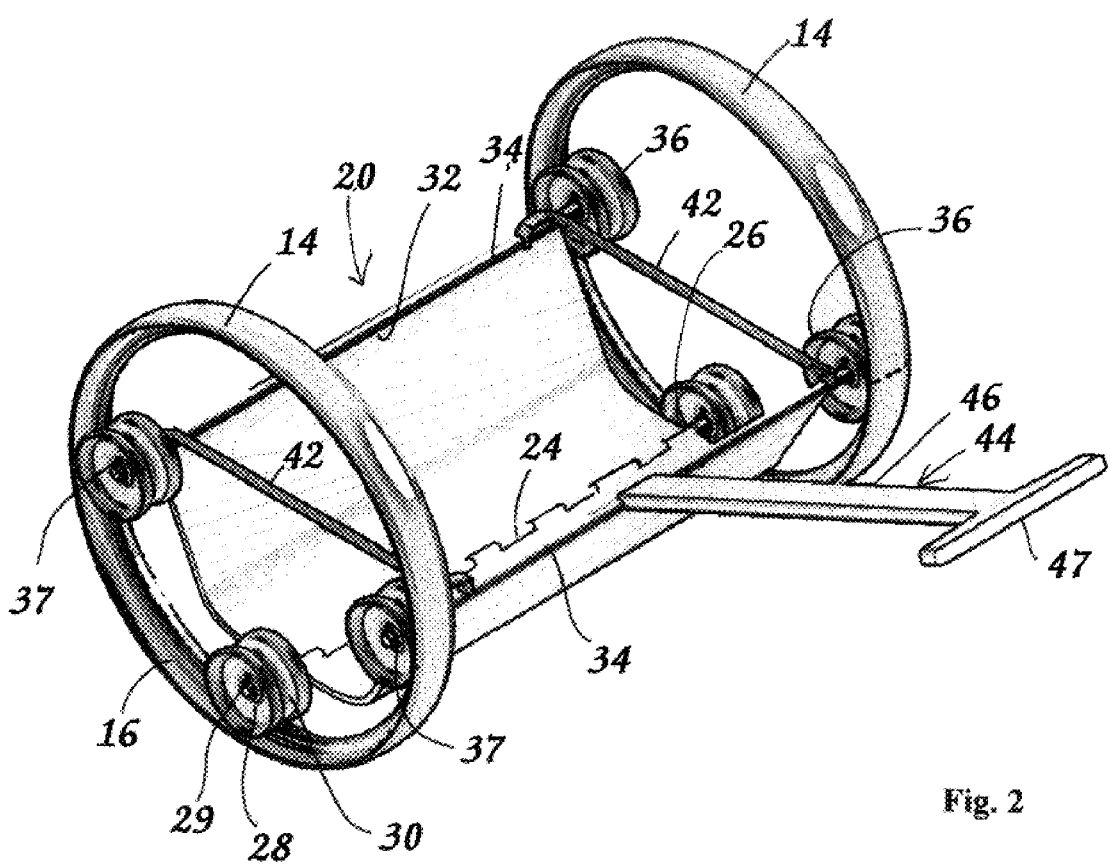
FIG. 2 is a top perspective view, in a pretransporting mode without the variety of items, showing a pair of removable stabilizing members to maintain the transporting basket in an open position.
Figure 3:
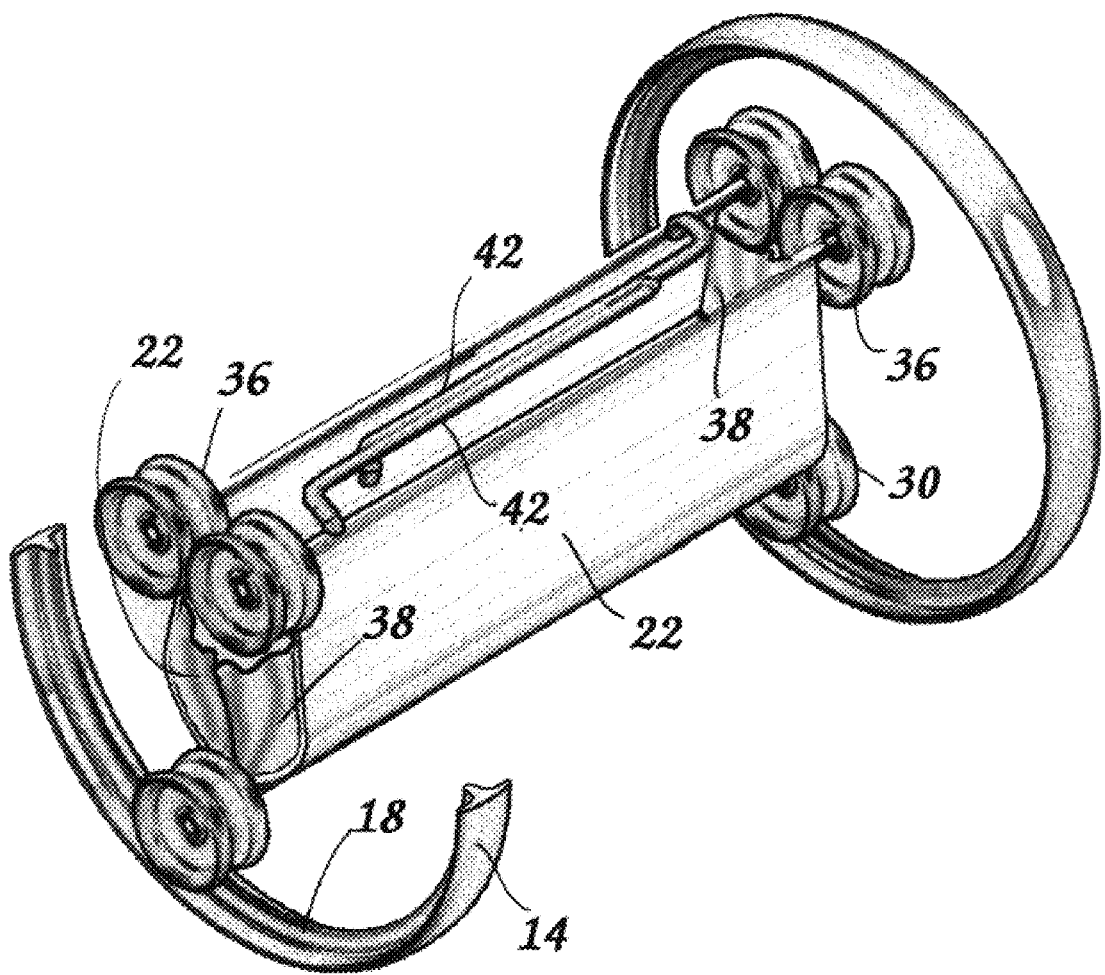
FIG. 3 is a partial, top perspective view showing the displacement of the stabilizing members to allow collapsing of the basket prior to storage of the rolling cart of this invention.
Figure 4:
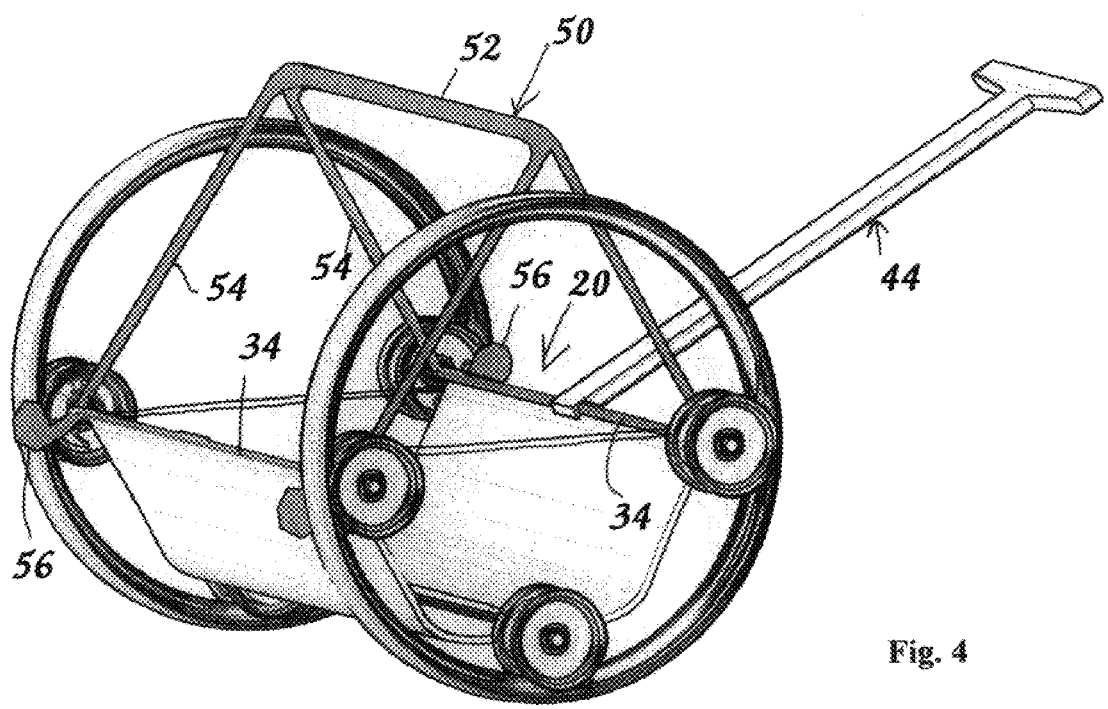
FIG. 4 is a side perspective view of the rolling cart hereof, further showing a hanger member for removably attaching to the rolling cart of this invention to lift same.

Disposed between said wheel rings is a basket assembly 20 comprising a pair of relatively rigid, V-shaped wall segments 22 (see FIG. 2), joined together along the bottom by a hinge 24, where a preferred hinge may be a piano hinge, as known in the art. Additionally, the hinge 24 includes an axle 26 (FIG. 2) and a pair of rollers 28 mounted, such as by threaded member 29, for rotative movement relative to the axle. The roller 28, as best seen in FIGS. 2–4, features a concave peripheral wall 30 configured to rotatively ride along said rib 18, as more fully discussed later. The free edges 32 of the respective wall segments each mount a transverse axle 34, where comparable rollers 36 are secured thereto in rotative relationship to a respective said axle 34, such as by threaded member 37. Finally, to complete the transporting enclosure, a pair of flexible webs or side walls 38 are provided, where said flexible webs are secured along the edges 40.

FIG. 2 is a partial perspective view of the open basket assembly 20, further showing a pair of spacer members 42 that are removably attached between the opposing said free edges and the corresponding axles 34. Such spacer members serve to maintain the basket assembly 20 open for receiving and transporting items, and to provide sufficient tension to maintain the respective rollers 36 in rolling contact with the continuous rib 18. A further feature of the basket assembly 20 is the provision of an elongated handle 44 consisting of an elongated portion 46 and a hand gripping element 47 at the free end thereof. It is recognized that some items one may desire to take to the beach can become cumbersome to pack within the basket assembly. As a consequence, the elongated portion may include plural openings 48 to receive such cumbersome items as an umbrella "U" or fishing poles "P". This leaves ample room to transport such items as a cooler, towels, toys, etc., collectively referenced in FIG. 1 as "I". It will be clear from the respective Figures that in a preferred embodiment the diameter of the wheel rings is about double that of the height of the basket assembly.

Figure 5:
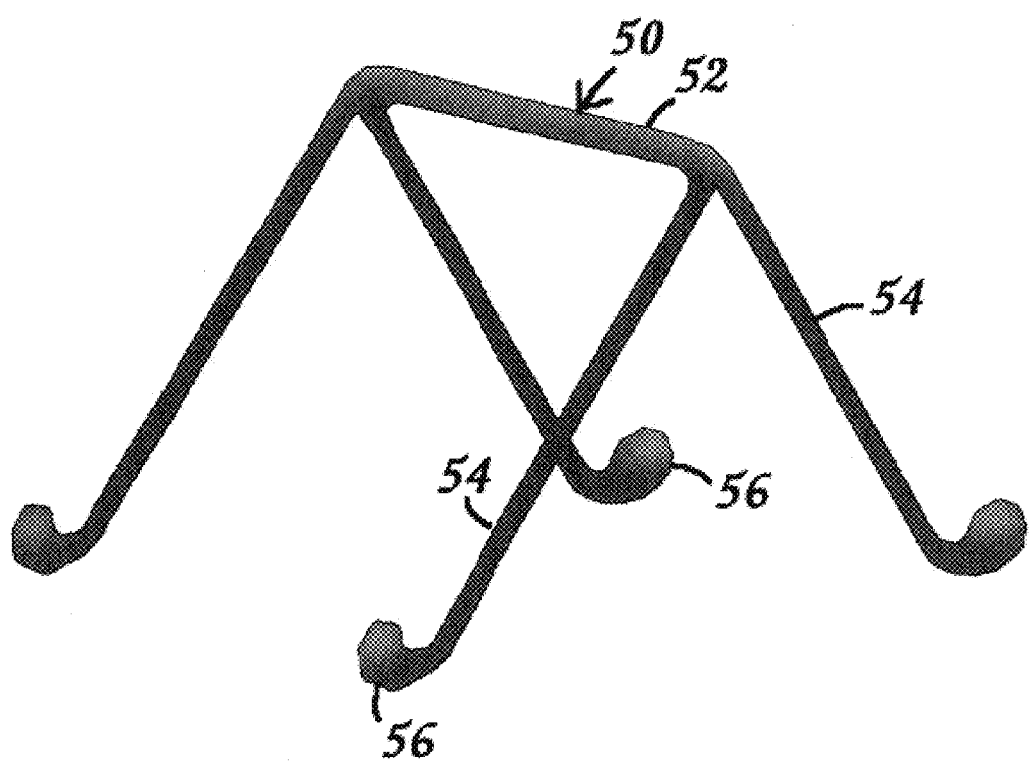
FIG. 5 is a perspective view showing the hanger element of FIG. 4.

Upon returning home, or for storage during the winter months, it is contemplated that the rolling cart hereof may be collapsed into a compact unit and suspended from a wall, etc. FIG. 3 illustrates the rolling cart 10, in part, and shows how the side wall segments 22 are initially pivoted toward one another, with the opposing flexible side webs 38 likewise collapsing. This results in a smaller unit for storing while freeing the wheel rings for storage also. A further convenience of the rolling cart hereof is its ability to be lifted vertically, such as up a series of steps, by the use of a hanger element 50, see FIG. 4. The hanger element 50 comprises a lateral hand gripping member 52 with each end thereof having a pair of diverging arms 54. To facilitate gripping of the rolling cart 10, the free ends of said diverging arms may include a flared portion 56, see FIGS. 4 and 5 to engage the opposing axles 34. Should the load not be that great, the rolling cart is well balanced with a high center of gravity thus allowing one to easily pull the cart up a series of steps.

It is recognized that changes, variations and modifications may be made to the rolling cart of this invention, particularly by those skilled in the art, without departing from the spirit and scope thereof Accordingly, no limitation is intended to be imposed thereof except as set forth in the accompanying claims.

What is claimed is:

1. A rolling cart for transporting items over a yielding surface, said rolling cart comprising a pair of circular and continuous ring wheels having an outer surface for rolling contact with said yielding surface, and an inner surface featuring an inwardly directed rib, and a basket arrangement comprising first and second rigid wall sections hingedly joined at a first lateral position, where said hinge includes an axle mounting a pair of rollers for riding along said rib, and a pair of wall edges, each having an axle mounting a pair of rollers for riding along said rib, whereupon during transporting said basket arrangement remains in a first orientation as said ring wheels rotate.

2. The rolling cart according to claim 1, wherein said rollers include a concave peripheral surface for engaging said rib.

3. The rolling cart according to claim 1, wherein a handle extends from one of said wall edge axles.

4. The rolling cart according to claim 3, wherein said handle comprises an elongated section terminating in a hand gripping member, where said elongated section includes plural apertures for removably securing additional said items.

5. The rolling cart according to claim 1, wherein each said first and second rigid wall sections are generally V-shaped.

6. The rolling cart according to claim 5, wherein said first and second rigid wall sections include opposing side edges at each side, and a flexible covering secured to said edges to form an enclosure for receiving said items.

7. The rolling cart according to claim 1, including at least a pair of removable spacer members for extending between said pair of wall edge axles in a transporting mode.

8. The rolling cart according to claim 7, where said spacer members may be removed to allow collapsing of said first and second rigid wall sections toward one another to place said cart in a compact storage mode.

9. The rolling cart according to claim 8, including a removable hanger element for contacting said pair of wall edge axles to allow suspension of said cart in said storage mode.

10. The rolling cart according to claim 9, wherein said hanger element includes a lateral member of discrete length, having a pair of ends, with each said end including a pair of diverging arms terminating in a flared extension, where said flared extensions are adapted to contact said wall edge axles.

* * * * *